(12) United States Patent
Lawson et al.

(10) Patent No.: US 10,178,854 B1
(45) Date of Patent: Jan. 15, 2019

(54) METHOD OF SOUND DESENSITIZATION DOG TRAINING

(71) Applicant: K&K Innovations LLC, Colorado Springs, CO (US)

(72) Inventors: Kristian Bristol Lawson, Colorado Springs, CO (US); Kevin Michael Henry, Warrenton, VA (US)

(73) Assignee: K&K Innovations LLC, Colorado Springs, CO (US)

( * ) Notice: Subject to any disclaimer, the term of this patent is extended or adjusted under 35 U.S.C. 154(b) by 0 days.

(21) Appl. No.: 16/106,877

(22) Filed: Aug. 21, 2018

(51) Int. Cl.
*A01K 15/02* (2006.01)

(52) U.S. Cl.
CPC ................ *A01K 15/021* (2013.01)

(58) Field of Classification Search
CPC .... A01K 15/02; A01K 15/021; A01K 15/022; A01K 27/009
USPC .......... 119/719, 720, 905, 908, 718
See application file for complete search history.

(56) References Cited

U.S. PATENT DOCUMENTS

| | | | |
|---|---|---|---|
| 5,351,653 A | 10/1994 | Marischen et al. | |
| 5,749,324 A | 5/1998 | Moore | |
| 7,409,924 B2 | 8/2008 | Kates | |
| 7,434,541 B2 | 10/2008 | Kates | |
| 7,617,799 B2 | 11/2009 | Kates | |
| 7,634,975 B2 | 12/2009 | Kates | |
| 7,861,676 B2 | 1/2011 | Kates | |
| 8,251,019 B2 | 8/2012 | Hultgren | |
| 8,505,494 B2 | 8/2013 | Mainini | |
| 8,776,730 B2 * | 7/2014 | Levi | G09B 19/00 119/712 |
| 8,839,744 B1 | 9/2014 | Bianchi et al. | |
| 9,226,477 B2 | 1/2016 | Davis | |
| 9,226,479 B2 | 1/2016 | Bianchi et al. | |
| 9,538,725 B2 | 1/2017 | Bianchi et al. | |
| 9,661,828 B2 | 5/2017 | Bianchi et al. | |
| 9,723,813 B2 | 8/2017 | Davis | |
| 9,723,814 B2 | 8/2017 | Davis | |
| 9,763,427 B2 | 9/2017 | Bianchi et al. | |
| 9,801,356 B2 | 10/2017 | Bianchi et al. | |
| 9,924,702 B2 | 3/2018 | Bianchi et al. | |
| 2006/0196445 A1 | 9/2006 | Kates | |
| 2008/0036594 A1 | 2/2008 | Kates | |
| 2008/0223300 A1 | 9/2008 | Kates | |
| 2011/0082574 A1 * | 4/2011 | Pachet | A01K 15/02 700/94 |
| 2012/0006282 A1 | 1/2012 | Kates | |
| 2012/0240863 A1 * | 9/2012 | Araujo | A01K 5/02 119/51.01 |

(Continued)

*Primary Examiner* — Yvonne R Abbott-Lewis
(74) *Attorney, Agent, or Firm* — BL Speer & Associates; Brenda L. Speer

(57) ABSTRACT

The present invention is a method of sound desensitization dog training. The method may be conducted in-person or unattended by a user by means of a smart device through use of a software application operated on the smart device. The method comprises steps of a user selecting a training sound, testing a training sound, setting a duration and a frequency of play cycle for the training sound, playing the training sound repeatedly during a training session, and ending the training session. Optionally, the method may comprise an additional step of dispensing a treat from a treat dispenser after playing the training sound.

8 Claims, 2 Drawing Sheets

(56) References Cited

U.S. PATENT DOCUMENTS

| | | |
|---|---|---|
| 2012/0312247 A1* | 12/2012 | Ebersole ................ A01K 15/02 119/712 |
| 2014/0251232 A1* | 9/2014 | Bianchi ................ A01K 15/021 119/720 |
| 2014/0251233 A1* | 9/2014 | Bianchi ................ A01K 15/021 119/720 |
| 2015/0075446 A1 | 3/2015 | Hu |
| 2016/0007565 A1* | 1/2016 | Trottier .................... A01K 5/02 119/51.02 |
| 2016/0015004 A1 | 1/2016 | Bonge, Jr. |
| 2016/0100556 A1 | 4/2016 | Bianchi et al. |
| 2017/0180959 A1 | 6/2017 | Kim |
| 2017/0196196 A1 | 7/2017 | Trottier et al. |
| 2017/0280674 A1 | 10/2017 | Davis |
| 2018/0049408 A1 | 2/2018 | Bianchi et al. |
| 2018/0132453 A1* | 5/2018 | Foster ................ A01K 15/021 |

\* cited by examiner

METHOD OF SOUND DESENSITIZATION DOG TRAINING

BACKGROUND OF THE INVENTION

Field of the Invention

The present invention relates to a method of sound desensitization dog training which may be conducted in-person or unattended by a user by means of a smart device.

Description of Related Art Including Information Disclosed Under 37 CFR 1.97 and 37 CFR 1.98

Ivan Pavlov is famous for his theory of classical conditioning in dogs. Pavlov was able to teach dogs to salivate at the sound of a bell. Dogs naturally salivate when they see or smell food. What Pavlov did was to ring a bell prior to bringing the food into the room. Overtime, the dogs became conditioned to associate the sound of the bell with the appearance of food. This method is known as conditioning. Just as Pavlov was able to associate the sound of the bell with food, so can we dis-associate undesirable behaviors that have been naturally conditioned over time. This is known as counter-conditioning. Various purposes conditioning and counter-conditioning methods and apparatuses for training dogs or other animals are known.

U.S. Pat. No. 5,351,653. issued Oct. 4, 1994, by Marischen et al. for "Animal Training Method Using Positive and Negative Audio Stimuli" discloses a method for training an animal capable of learning to associate a consistent positive audio tone with pleasant feelings. The method includes a consistent positive audio tone capable of being sensed by the animal without startling the animal, and a consistent negative audio tone distinct from the positive audio tone capable of being sensed by the animal and startling the animal. The invention enables a trainer to encourage good behavior by the animal by applying the positive audio tone after the animal has been trained to associate the positive audio tone with pleasant feelings, and to discourage bad behavior by the animal by applying the negative audio tone.

U.S. Pat. No. 5,749,324 issued May 12, 1998, by Moore for "Apparatus and Method for Controlling Animal Behavior" discloses an apparatus for controlling animal behavior comprising a sound-processing means selectively responsive to a plurality of sounds, an actuator means coupled to the sound-processing means selectively responsive to a plurality of electrical inputs from the sound processing means, and a stimulus generating means coupled to the actuator means. The stimulus provided an animal may include a human voice command with respect to the behavior correlated with the sound produced by the animal.

U.S. Pat. No. 7,409,924 issued Aug. 12, 2008, by Kates for "Training, Management, and/or Entertainment System for Canines, Felines, or Other Animals," U.S. Pat. No. 7,434,541 issued Oct. 14, 2008, by Kates for "Training Guidance System for Canines, Felines, or Other Animals," U.S. Pat. No. 7,617,799 issued Nov. 17, 2009, by Kates for "System and Method for Computer-Controlled Animal Toy," U.S. Pat. No. 7,634,975 issued Dec. 22, 2009, by Kates for "Training and Behavior Controlling System for Canines, Felines, or Other Animals," U.S. Pat. No. 7,861,676 issued Jan. 4, 2011, by Kates for "Training Guidance System for Canines, Felines, of Other Animals," US Patent Application 2006/0196445 published Sep. 7, 2006, by Kates for "System and Method for Canine Training," US Patent Application 2008/0036594 published Feb. 14, 2008, by Kates for "System and Method for Canine Training," US Patent Application 2008/0223300 published Sep. 18, 2008, by Kates for "System and Method for Computer-Controlled Pet Water Dispenser," and US Patent Application 2012/0006282 published Jan. 12, 2012, by Kates for "Training Guidance System for Canines, Felines or Other Animals" disclose a computer-aided training and management system that uses a computer or other processor in wireless communication with an instrumented dog collar and/or optionally, one or more dog interaction devices, such as, for example, video monitors, loudspeakers, video cameras, training toys (e.g., ball, bone, moving toy, etc.), an animatronics "trainer," a treat dispenser, a food dispensing and monitoring device, a water dispensing and monitoring device, tracking devices, a dog door, dog-monitoring doghouse, a dog-monitoring dog toilet, is described. In one embodiment, the instrumented dog collar is in two-way communication with a central computer system.

U.S. Pat. No. 8,251,019 issued Aug. 28, 2012, by Hultgren for "Can the Barking Dog Systems" discloses an audible device that individuals can use to train their dogs to refrain from barking uncontrollably. This item comprises a small metal aluminum container that has loose material (media) inside to create a jarring audible noise. Users simply shake the device creating a noise that stops a dog from barking. The container may be coated in rubber for increased durability. The device may have a wrist loop attached to the top making it easy for users to carry the device while walking a dog. The loose materials may be metal marbles or other items that create a metal-on-metal sound that is effective in capturing a dog's attention. The device may be designed with a button-operated component that compresses the loose material allowing users to silence the device in between uses. Further, the dog-bark inhibiting and training device includes a kit and a method of use.

U.S. Pat. No. 8,505,494 issued Aug. 13, 2013, by Mainini for "Method and Device for Desensitizing an Animal to an Anxiety Inducing Sound" discloses a counter-conditioning device and method for desensitizing an animal to an anxiety inducing sound and for minimizing a user's required involvement in such desensitization. The device and method are for automatically conditioning an animal that exhibits anxiety in response to the occurrence of a particular sound such that the animal learns to anticipate a treat upon the occurrence of the sound.

U.S. Pat. No. 8,839,744 issued Sep. 23, 2014, by Bianchi et al. for "Mobile Telephone Dog Training Tool and Method," U.S. Pat. No. 9,226,479 issued Jan. 5, 2016, by Bianchi et al. for "Mobile Telephone Dog Training Tool and Method," U.S. Pat. No. 9,538,725 issued Jan. 10, 2017, by Bianchi et al. for "Mobile Telephone Dog Training Tool and Method," U.S. Pat. No. 9,661,828 issued May 30, 2017, by Bianchi et al. for "Mobile Telephone Dog Training Tool and Method," U.S. Pat. No. 9,763,427 issued Sep. 19, 2017, by Bianchi et al. for "Mobile Telephone Dog Training Tool and Method," U.S. Pat. No. 9,801,356 issued Oct. 31, 2017, by Bianchi et al. for "Mobile Telephone Dog Training Tool and Method," U.S. Pat. No. 9,924,702 issued Mar. 27, 2018, by Bianchi et al. for "Mobile Telephone Dog Training Tool and Method," US Patent Application 2016/0100556 published Apr. 14, 2016, by Bianchi et al. for "Mobile Telephone Dog Training Tool and Method," and US Patent Application 2018/0049408 published Feb. 22, 2018, by Bianchi et al. for "Mobile Telephone Dog Training Tool and Method" disclose a mobile telephone that adapts to use as a gundog training tool by interfacing with a dog collar using a wireless communication device, such as a WWAN text or IP interface, a WLAN interface or a radio transceiver that couples to the mobile telephone and is accessible to a training application running on the mobile telephone. The dog collar includes a GPS receiver to provide position information to the mobile telephone and a shock device to provide training stimulus to the dog. A wireless headset interfaces with the mobile telephone to provide audible indications of position to an end user, such as a dog point and tone indicators of directions to the dog. A wireless handset interfaces with the mobile telephone to accept inputs for application to the collar, such as training stimulus.

U.S. Pat. No. 9,226,477 issued Jan. 25, 2016, by Davis for "Internet Canine Communication Device and Method," U.S. Pat. No. 9,723,813 issued Aug. 8, 2017, by Davis for "Internet Canine Communication Device and Method," U.S. Pat. No. 9,723,814 issued Aug. 8, 2017, by Davis for "Internet Canine Communication Device and Method," and US Patent Application 2017/0280674 published Oct. 5, 2017, by Davis for "Internet Canine Communication Device and Method" disclose enhanced methods and systems for human-pet communication. Example embodiments provide an Internet Canine Communication System ("ICCS"). The ICCS facilitates remote communication and interaction with between a dog and its owner, caretaker, trainer, family member, or the like. The ICCS may include a base station or similar device that is configured to deliver treats to a dog and to transmit audio/visual communication between the dog and a remote client device operated by a human user. The ICCS may also facilitate training the dog to utilize the ICCS to communicate with the user, such as by answering calls from or initiating calls to the remote client device of the user.

US Patent Application 2015/0075446 published Mar. 19, 2015, by Hu for "Pet Training System" discloses a training system for a pet of a user with a smart phone includes at least one collar module that is adapted to be fixed with and deliver a stimulus to the pet. Each collar module includes an enclosure, at least one stimulus transducer, and a circuit that includes at least a power source, a wireless receiver capable of receiving an instruction signal from the portable electronic device, and a memory. The at least one stimulus transducer may be an audio transducer, a vibration transducer, an electrostatic shock transducer, or the like. A software application resident on the portable electronic device is adapted to display on the display screen a choice of actuators for the user representing one of the at least one stimulus transducers, and a pet's name in the case of multiple pets. A barking control and virtual fence arrangement is further included.

US Patent Application 2016/0015004 published Jan. 21, 2016, by Bonge, Jr. for "Wireless Animal Training, Monitoring and Remote Control System" discloses an animal training and/or monitoring system and an animal-worn device that is capable of receiving and sending various inputs and outputs, respectively, from/to a wireless mobile device. The wireless mobile device has a software application that allows a human user to wirelessly communicate with the animal-worn transceiver via direct, networked or cellular wireless protocols. The animal-worn device interacts with the applications on the wireless mobile device to allow for a variety of functions, such as the transfer of commands or stimuli to the animal, the transfer of data regarding the animal or its environment to the wireless mobile device, and/or the transfer of instructions from the animal-worn device to an external device. The wireless mobile device may also transmit new firmware to the animal-worn device to modify its inputs and outputs.

US Patent Application 2017/0180959 published Jun. 22, 2017, by Kim for "Animal Mobile Phone Service System and Method" discloses an animal mobile phone service system and method. The system comprises: a mobile terminal attached to a pet; an AMS management server for interworking with the mobile terminal attached to the pet, a mobile communication terminal of an owner or a guardian of the corresponding pet, and an AMS management server of a mobile communication network, the AMS management server providing an animal mobile phone service (AMS) including a method of training eating and bowel habits for a pet, music playing for a pet, identifying a location of a pet, a guardian notification function when a pet strays out of a predetermined zone after setting an active zone of the pet, and a vaccination and medical history management for a pet; a GIS map server for interworking with the AMS management server, displaying current location information of the mobile terminal attached to the pet, collecting a frequently moving path, and when the pet is missing or strays out of the predetermined zone, remotely tracing location information of the mobile terminal attached to the pet by providing an LBS service on a GIS map; and a text message server for, when the pet is missing or strays out of the predetermined zone, transmitting a warning message from the AMS management server to a mobile phone number of the mobile communication terminal of the owner or the guardian and generating a warning sound. Wherein the system provides, from the mobile communication terminal of the owner or the guardian of the animal to the mobile terminal of a pet, a remote voice communication service for a remote communication, a conversation with an animal, and a pet training to enable a pet or a military dog to perform a certain purpose, using human to animal (H2A) function.

US Patent Application 2017/0196196 published Jul. 13, 2017, by Trottier et al. for "Animal Interaction Devices Systems and Methods" discloses devices, systems and methods for animal training, animal feeding, animal management, animal fitness, monitoring and managing animal food intake, remote animal engagement, behavioral training and animal entertainment are disclosed. Embodiments of the present invention provide devices, systems and methods for measuring a dog's energy expenditures and/or movements, and providing signals to the dog to engage in activities or games to earn food. In one aspect, one or more of the dog's activity level, age, weight, body mass, and/or other health information is utilized to determine an appropriate food intake level for the dog. By measuring the dog's activity, the amount of calories the dog needs and/or has utilized may be determined. By encouraging activity by the dog, the dog's health may improve, even if the dog's weight remains unchanged. Among other embodiments disclosed herein, various mechanisms capable of moderating animal noise and/or behavior are disclosed.

A disadvantage of the foregoing methods is they all use a secondary device, such as an animal-worn or animal-interface apparatus, in conjunction with a remote control or smart device to perform the method. There is a need for a method to help desensitize, alleviate or eliminate fearful, aggressive and anxious behaviors by animals, in particular dogs, in reaction to noises to which the animals are sensitized, and which method may be used either actively by a user or animal owner and attended in-person, or inactively and unattended by a user or animal owner, as well as which method does not require an animal-worn or animal-interface apparatus.

BRIEF SUMMARY OF THE INVENTION

A method of sound desensitization animal training using a smart device system comprising the steps of: providing a smart device to store a software application and to store at least a training sound; providing at least a speaker in communication with the smart device to play the training sound; optionally providing a treat dispenser in communication with the smart device; launching the software application; selecting at least a training sound from the software application; optionally selecting at least another training sound from the software application; optionally testing the training sounds volume level to determine an appropriate learning threshold for an animal; setting the training sounds volume level with the software application; setting a repetition of a play cycle for playing the training sound with the software application; setting a duration of a training session for repetition of the play cycle with the software application; starting the training session with the software application; playing repeatedly the training sound from the speaker during the training session per the play cycle set with the software application; optionally dispensing a treat from the treat dispenser at least once at a random interval after each repetition of the step of playing repeatedly the training sound from the speaker during the training session per the play cycle set with the software application; and ending the training session per the duration set with the software application.

BRIEF DESCRIPTION OF THE SEVERAL VIEWS OF THE DRAWING(S)

Figure 1:
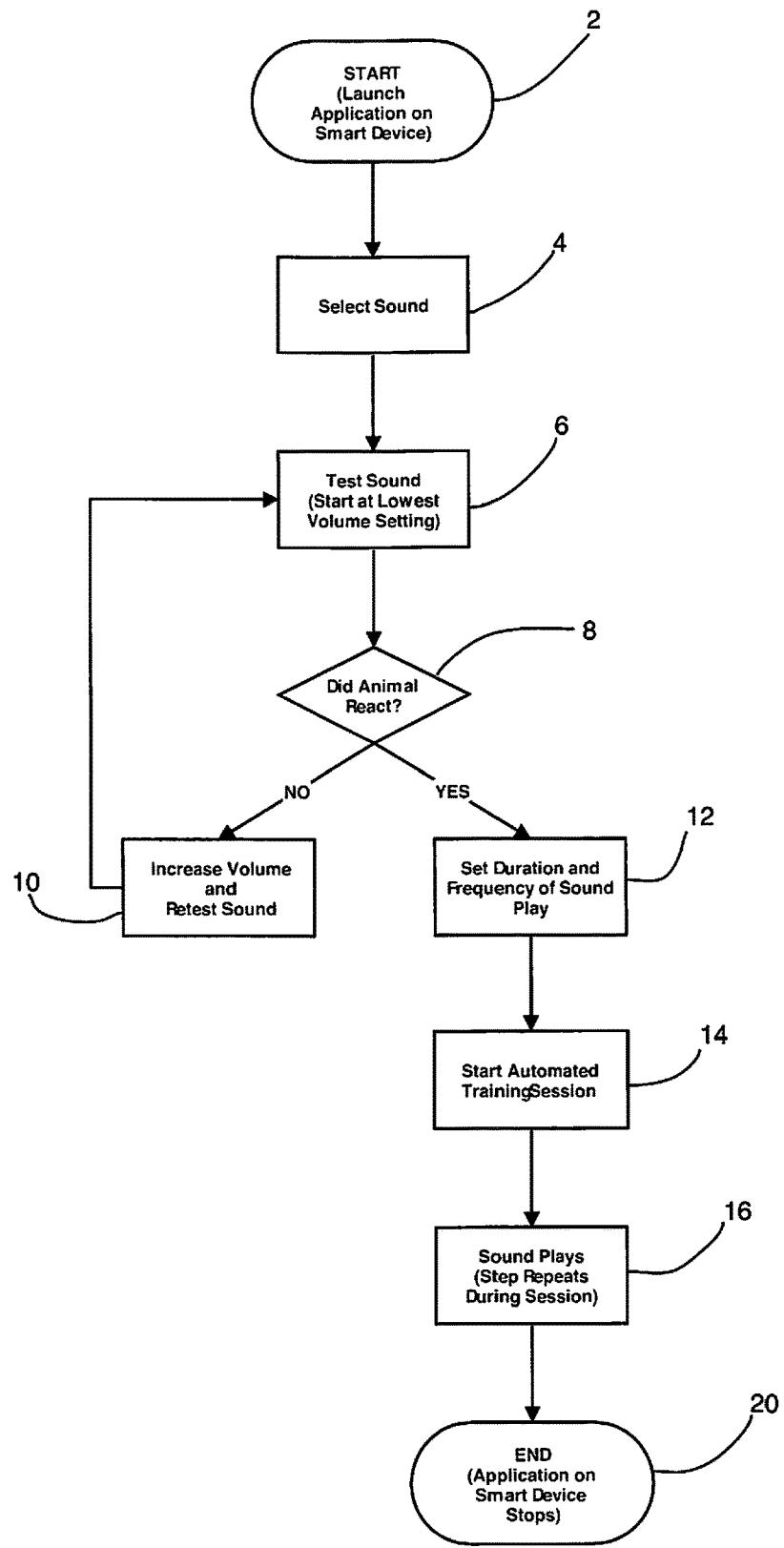
FIG. 1 is a flow diagram illustrating an embodiment of the method of the present invention.

LIST OF REFERENCE NUMERALS 2 start process
4 select sound
6 test sound
8 determine reaction
10 increase volume
12 set duration and frequency
14 start session
16 sound plays
18 dispense treat
20 end process

DETAILED DESCRIPTION OF THE INVENTION

Animals, in particular dogs, are sensitized or conditioned to everyday sounds, such as doorbells. From an animal owner's perspective, some sounds have sensitized, or conditioned an unwanted response in, the animal to the sounds. For example, each time an owner's or user's doorbell rings, the condition of the animal to respond is strengthened as there is usually a positive or negative element that follows the sound. A positive element could be a friend arriving of whom the user's dog is fond. A negative element could be the user pushing the dog away as the user tries to greet someone at the door, such as to sign for a delivery.

An owner's or user's dog is unable to predetermine, based on the conditioned sound, which element, positive or negative, will occur. As a result, the dog begins to get anxious. The anxiety often manifests as a negative behavior, such as barking, stiffening, jumping, pacing or being underfoot of the owner.

The method of the present invention provides training of an animal in a low stress environment for the animal. The method of the present invention helps alleviate fearful, aggressive and anxious behaviors in animals in response to surrounding everyday noises. The method of the present invention avoids 'flooding' of an animal's senses and does not stress the animal, because the method slowly counter-conditions the animal over many, if not dozens of, hours of training to respond in a neutral or positive manner to a sound to which the animal previously reacted in a negative or undesired manner. The method of the present invention further does not stress an animal, because the method does not employ an animal-interactive or animal-worn apparatus, such as a leash, harness or shock collar, which can be uncomfortable, aggravating or painful to the animal.

The method of the present invention uses a neutral or positive response element to counter-condition, recondition, desensitize or disassociate the user's dog to react in a neutral or positive manner to a sound to which the dog already is sensitized or conditioned to react to in a negative, anxious or other undesired manner. The method of the present invention is able quickly to desensitize or counter-condition a dog as compared to non-automated methods, because the method of the present invention can be operated optionally in an unattended mode by a user and will work unattended for hours each day. For example, a user's dog may hear a doorbell up to three times a day. With the method of the present invention, a user's dog can be desensitized or counter-conditioned with a training sound that is played repeatedly from about two to about five times an hour for as many hours at a time as a user wants.

The method of the present invention for conducting dog desensitization training is more particularly described as a method for conducting dog desensitization training, in particular aural stimulus desensitization, through use of a software application operated on a smart device, such as a mobile phone or tablet. The method of the present invention may be conducted by a user either in-person or unattended by means of the smart device.

The method of the present invention uses a software application on a smart device which, through automation, allows a user to train a dog for hours a day while only requiring seconds of the user's time. The smart device stores and operates the software application and at least a desensitizing or training sound. The smart device also either is in communication with an external speaker or has an internal speaker, which speaker plays or delivers the desensitizing or training sound. The method uses counter-conditioning or desensitization paired with neutral or positive reinforcement to reduce or remove stressful behaviors associated with different training sounds. The method uses an algorithm to play the user's selected training sounds randomly, at pre-defined intervals. The algorithm paired with the user's selected volume and replay frequency for the training sound is designed to provide a consistent and calm learning environment for the animal or dog.

In a preferred embodiment of the present invention, the method must be used so that a dog learns, or is desensitized or reconditioned, at a pace with which the dog is comfortable. To do so, a training sound is started at a low volume level and threshold and gradually overtime, the volume level may be increased. The animal will not demonstrate results immediately, but rather will become desensitized to the training sound overtime with repetition. Likewise, the animal's newly learned, desensitized behavior will need to be refreshed periodically with the method after the animal has learned or been desensitized to ignore a training sound.

For example, in using the method of the present invention, one of the inventor's own experience demonstrated that his border collie dog took 14 days before the dog was desensitized and learned to completely ignore the training sound of a doorbell. Further, mixed results were experienced at day 7 of training with the method of the present invention; however, the majority of the dog's gains in desensitization to the training sound came between days 10 through 14 of training with the method of the present invention.

As previously stated, the method of the present invention uses a software application loaded on and operated by a smart device. The method of the present invention also uses at least a speaker to play the training sound, which speaker is either separate from, but in communication with the smart device, or part of and integrated with the smart device.

In using the method of the present invention, it is important to use an adequate speaker to play the training sound to which an animal is being desensitized. The method of the present invention can work with any suitable speaker, including the speakers built in to a smart device, such as a cell or mobile phone, or a tablet. However, to get the best results, a suitable speaker should be used to best replicate the sound event, or training sound, for which the animal is being trained to be desensitized. For instance, if a user is trying to desensitize a dog to thunder or fireworks, then the user should be sure to use a suitable quality speaker to reproduce the training sound.

The method of the present inventions takes a few minutes to set up or program before use. A user selects a training sound or sounds and sets the learning threshold for the training sound volume, training duration period, and then tests the training sound volume level with the animal. The user should insure the speakers and smart device on which the software application is operated are both charged, or connected to electrical power, so that neither the speakers nor the device runs out of battery or electrical power. Once the application is set up or programmed, a user simply starts the application on the device to commence training of an animal for the pre-programmed period of duration of a training session.

The training method of the present invention comprises numerous steps. A user determines whether the user would like to use a pre-recorded training sound provided with the application or to record a training sound of the user's choice. The method of the present invention provides about 100 professionally recorded training sounds that commonly cause stress to animals or dogs. In the inventors' experience, they have found it is not necessary that a pre-recorded training sound, for example a doorbell, be the exact same as a user's doorbell for the method of the present invention to work and to desensitize an animal to the user's doorbell sound by using the pre-recorded doorbell training sound. Other example training sounds that may be pre-recorded and provided with the application used with the method of the present invention are young children, a vacuum cleaner, door noises (ex., knocking, keys, opening and closing), babies, footsteps, dog noises (ex., footsteps, growling, barking, etc.), fireworks, car noises (ex., horns, engines, backfires, etc.), doorbells, garage door noises (ex., opening and closing), thunder, city noises, etc.

Preferably a user chooses between first stage (single training sound) and second stage (multiple training sounds) automated training methods. First stage training is less stressful on an animal or dog and it is preferable to begin desensitizing a dog with a single training sound. As the dog becomes completely desensitized, or habituated, to a training sound it is important for a user to refresh and reinforce the dog's new behavior and to retrain the dog with that training sound periodically.

Once a dog has mastered or become desensitized to a training sound at the first stage, then the user preferably begins training the dog with second stage training. Second stage training is preferably used to play several of the training sounds to which the dog has already become desensitized or learned to ignore. Second stage training may be used by a user in order to reinforce the training sounds mastered by the dog.

Figure 2:
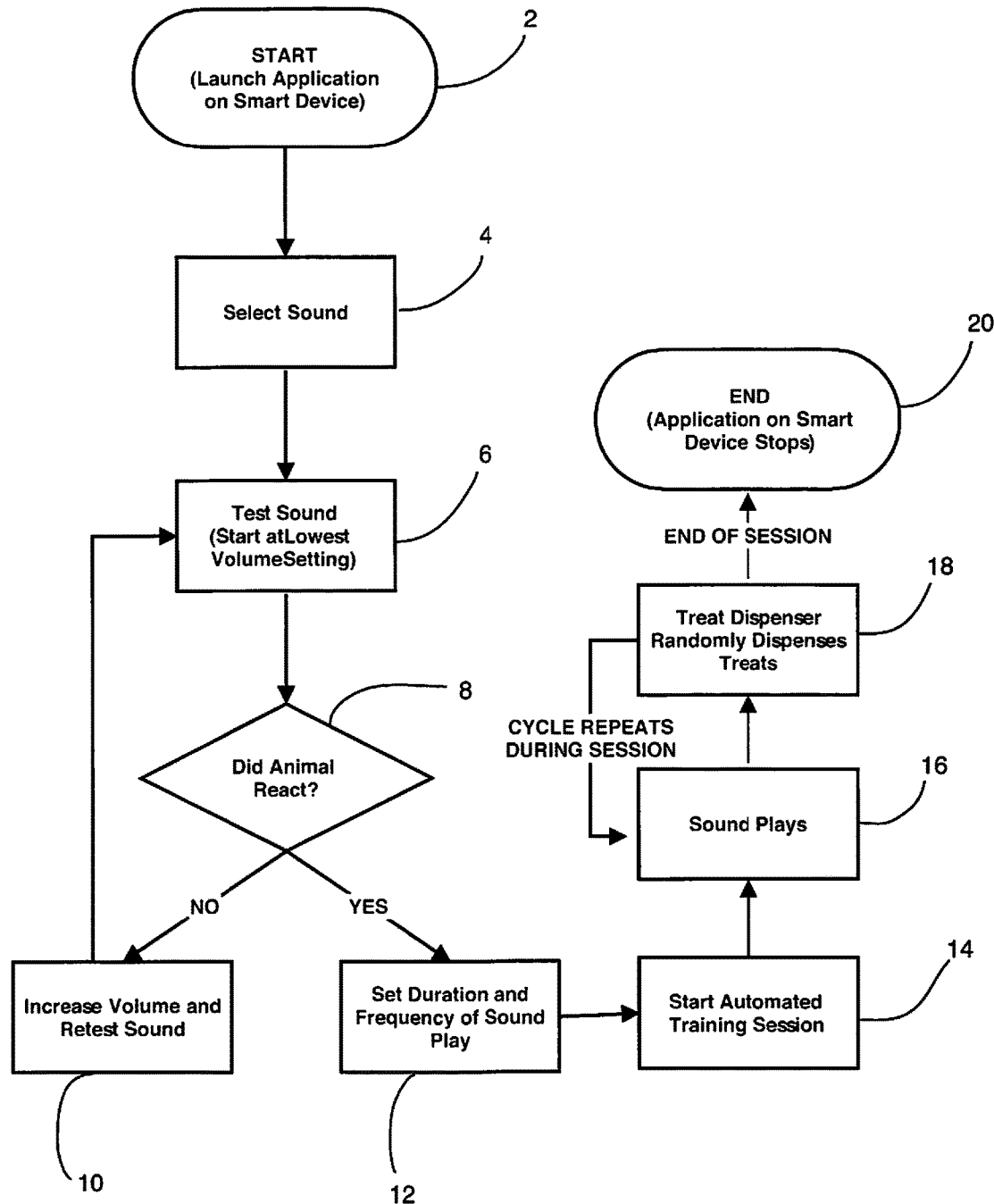
FIG. 2 is a flow diagram illustrating another embodiment of the method of the present invention.

With reference to FIG. 1 and FIG. 2, in a first step 2 of the present invention, the user starts or launches the software application on a smart device. selects a training sound. In a second step 4 of the present invention, the user may select or choose one or more of the professionally pre-recorded sounds provided, or may choose the user's recorded, custom training sound or sounds.

With reference to FIG. 1 and FIG. 2, in a third step 6, the user tests the training sound volume level to determine an appropriate learning threshold for the animal or dog. For an ideal learning environment with the method of the present invention, it is important that the training sound volume and the training sound repetition frequency and training session duration are set appropriately. It is preferred in using the method of the present invention that the user initially select the lowest training sound volume level that still garners a visible or audible reaction from the dog per decision node 8 (Did Animal React?). Depending on whether the dog reacted per decision node 8, then either the user performs a secondary, and possibly repetitive, third step 10 and increases the volume and retests sound 6, or performs a fourth step 12 as discussed below. The learning threshold and training sound volume are preferably gradually increased over time in using the method of the present invention as the dog is becoming desensitized or habituated to the training sound, until the user is employing the same training sound volume as the sound volume of an actual sound event to which the user wants to desensitize the dog.

With reference to FIG. 1 and FIG. 2, in a fourth step 12, the user sets the frequency, or repetitions per hour, for a play cycle to play the training sound. The algorithm of the software application provides that a training sound does not play within about a ten-minute period of the same training sound. The user can set the training sound play or repetition frequency between about two to about five repetitions per hour and should treat this as a threshold adjustment as stated below. Preferably, the frequency or repetitions per hour of a training sound may be from about one to about four per hour, but may be repeated as often as determined by a user. Preferably, during a training session, a training sound is not repeated within ten minutes of a prior-played training sound. Preferably, at the commencement of training a dog with the method of the present invention, only two repetitions per hour of the training sound are played during a training session. Over time in using the method of the present invention, the user may increase slowly the frequency or repetitions of a play cycle of the training sound during a training session as the dog learns to process the training sound and to allow the animal's stress to dissipate completely before another training sound is played in the same training session.

With reference to FIG. 1 and FIG. 2, in the fourth step 12 the users also sets the duration of a training session in which the training sound is played. Training session duration gives the user another means by which to lower the learning threshold for the dog. Preferably, the user sets the duration to last for an entire time the user is away, or absent from the dog's presence, to maximize the amount of time over which the dog can learn or be desensitized. However, if the dog has a particularly stressful reaction to a training sound and the user is already playing the sound at the lowest volume level, then reducing the training session duration is a helpful variable for the user to employ in desensitizing the dog to the training sound.

With reference to FIG. 1 and FIG. 2, in a fifth step 14, the user starts a training session with the animal. In a sixth step 16, during a training session, the smart device on which the application is being operated will remain in an 'awake' or 'active' mode and the application will continue to run and the training sound will continue to play at the predetermined repetition frequency and for the predetermined overall duration of the training session. Preferably, for a training session, the training sound is played at a random repetition frequency for the duration of the training session.

With reference to FIG. 1 and FIG. 2, in a final step 20 the application stops running and the training session ends. Upon completion of a training session, the application has a feature by means of which the application will provide a user with a summary of information regarding the training session, such as the training sound or sounds played, the number of repetitions the training sound was played, the volume at which the training sound was played, the duration or total time of the training session, and other training session variables.

With reference to FIG. 2, in another, optional embodiment of the method of the present invention, a treat dispenser may be used. The treat dispenser may serve as a positive element in the training or desensitization process. In the optional embodiment, the software application of the method of the present invention is in communication with or able to interface with an automatic or remotely operated treat dispenser. The treat dispenser will provide a positive reward in connection with the counter-conditioning of a negative trigger of an animal's behavior. Dispensing a treat from the dispenser to the animal will reinforce the teaching of a positive behavior in the animal, while removing a negative behavior in the animal.

With reference to FIG. 2, in the other embodiment of the method of the present invention, when a training sound is played in the sixth step 16, the sound will signal or trigger the treat dispenser to begin a seventh step 18 in which a timed, semi-random release of treats occurs. In this embodiment, the cycle of the sixth step 16 and the seventh step 18 is repeated during the training session. The frequency and time-delayed release of the treats during a training session will be random, but pre-programmed by constraints provided by the software application. For instance, during a training session, preferably, a first treat will be released immediately upon playing the training sound for the first time. Preferably, a second treat will be released randomly between about 10 seconds to about 20 seconds after the training sound is played a second time. Preferably, a third treat will be released randomly between about 30 seconds to about 60 seconds after the training sound is played a third time. Preferably, a fourth treat would be released between about 60 seconds and about 120 seconds after the training sound is played a fourth time. Preferably, a fifth treat will be released between about 120 seconds and about 300 seconds after the training sound is played a fifth time.

The software application operated on a smart device and used with the method of the present invention is capable of use with different smart device operating platforms or systems, such as Android or iOS. The application used with the method of the present invention is also smart device agnostic with regard to both manufacturer and type, such as a tablet, cell or mobile phone, or other device capable of operating the application.

Although the present invention has been described with reference to specific embodiments, it is understood that modifications and variations of the present invention are possible without departing from the scope of the invention, which is defined by the claims set forth below. Unless defined otherwise, all technical and scientific terms used herein have the same meaning as commonly understood by one of ordinary skill in the art to which this invention belongs. Any methods and materials similar or equivalent to those described herein can also be used in the practice or testing of the present invention; however, the preferred methods and materials are now described.

The invention claimed is:

1. A method of sound desensitization animal training using a smart device system comprising the steps of:
   a. providing a smart device to store a software application and to store at least a training sound;
   b. providing at least a speaker in communication with the smart device to play the training sound;
   c. launching the software application;
   d. selecting at least a training sound from the software application;
   e. setting the training sound volume level with the software application;
   f. setting a repetition of a play cycle for playing the training sound with the software application;
   g. setting a duration of a training session for repetition of the play cycle with the software application;
   h. starting the training session with the software application;
   i. playing repeatedly the training sound from the speaker during the training session per the play cycle set with the software application; and
   j. ending the training session per the duration set with the software application.

2. The method of claim 1, further comprising a step of testing the training sound volume level to determine an appropriate learning threshold for an animal prior to the step of setting the training sound volume level with the software application.

3. The method of claim 1, further comprising a step of selecting at least another training sound from the software application after the step of selecting at least a training sound from the software application, and thereafter during the step of playing repeatedly the training sound, playing repeatedly the selected training sounds from the speaker during the training session per the play cycle set with the software application.

4. The method of claim 1, further comprising providing a treat dispenser in communication with the smart device and a step of dispensing a treat from the treat dispenser at least once at a random interval after each repetition of the step of playing repeatedly the training sound from the speaker during the training session per the play cycle set with the software application.

5. A method of sound desensitization animal training using a smart device system comprising the steps of:
   a. providing a smart device to store a software application and to store at least a training sound;
   b. providing at least a speaker in communication with the smart device to play the training sound;
   c. providing a treat dispenser in communication with the smart device;

d. launching the software application;
e. selecting at least a training sound from the software application;
f. setting the training sound volume level with the software application;
g. setting a repetition of a play cycle for playing the training sound with the software application;
h. setting a duration of a training session for repetition of the play cycle with the software application;
i. starting the training session with the software application;
j. playing repeatedly the training sound from the speaker during the training session per the play cycle set with the software application;
k. dispensing a treat from the treat dispenser at least once at a random interval after each repetition of the step of playing repeatedly the training sound from the speaker during the training session per the play cycle set with the software application; and
l. ending the training session per the duration set with the software application.

6. The method of claim 5, further comprising a step of testing the training sound volume level to determine an appropriate learning threshold for an animal prior to the step of setting the training sound volume level with the software application.

7. The method of claim 5, further comprising a step of selecting at least another training sound from the software application after selecting the training sound from the software application, and thereafter during the step of playing repeatedly the training sound, playing repeatedly the selected training sounds from the speaker during the training session per the play cycle set with the software application.

8. A method of sound desensitization animal training using a smart device system comprising the steps of:
 a. providing a smart device to store a software application and to store at least a training sound;
 b. providing at least a speaker in communication with the smart device to play the training sound;
 c. providing a treat dispenser in communication with the smart device;
 d. launching the software application;
 e. selecting at least a training sound from the software application;
 f. selecting at least another training sound from the software application;
 g. testing the training sounds volume level to determine an appropriate learning threshold for an animal;
 h. setting the training sounds volume level with the software application;
 i. setting a repetition of a play cycle for playing the training sounds with the software application;
 j. setting a duration of a training session for repetition of the play cycle with the software application;
 k. starting the training session with the software application;
 l. playing repeatedly the training sounds from the speaker during the training session per the play cycle set with the software application;
 m. dispensing a treat from the treat dispenser at least once at a random interval after each repetition of the step of playing repeatedly the training sounds from the speaker during the training session per the play cycle set with the software application; and
 n. ending the training session per the duration set with the software application.

\* \* \* \* \*